United States Patent
Ward et al.

(10) Patent No.: US 10,087,840 B2
(45) Date of Patent: Oct. 2, 2018

(54) GAS TURBINE ENGINE DE-ICING SYSTEM

(71) Applicant: United Technologies Corporation, Hartford, CT (US)

(72) Inventors: Thomas W. Ward, Manchester, CT (US); Scot A. Webb, Gales Ferry, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 405 days.

(21) Appl. No.: 14/781,943

(22) PCT Filed: Mar. 31, 2014

(86) PCT No.: PCT/US2014/032300
§ 371 (c)(1),
(2) Date: Oct. 2, 2015

(87) PCT Pub. No.: WO2014/204546
PCT Pub. Date: Dec. 24, 2014

(65) Prior Publication Data
US 2016/0017803 A1    Jan. 21, 2016

Related U.S. Application Data

(60) Provisional application No. 61/807,972, filed on Apr. 3, 2013.

(51) Int. Cl.
*F01D 25/02* (2006.01)
*F02C 7/047* (2006.01)

(52) U.S. Cl.
CPC .............. *F02C 7/047* (2013.01); *F01D 25/02* (2013.01); *F05D 2300/5024* (2013.01); *Y02T 50/672* (2013.01)

(58) Field of Classification Search
CPC ................................. F02C 7/047; F01D 25/02
See application file for complete search history.

(56) References Cited

U.S. PATENT DOCUMENTS

| | | | |
|---|---|---|---|
| 2,507,044 | A | 5/1950 | Palmatier |
| 3,253,404 | A | 5/1966 | Tonnies |

(Continued)

FOREIGN PATENT DOCUMENTS

| | | |
|---|---|---|
| EP | 1485290 | 12/2004 |
| FR | 2950928 | 4/2011 |

(Continued)

OTHER PUBLICATIONS

The International Search Report for PCT Application No. PCT/US2014/032300, dated Mar. 6, 2015.

(Continued)

*Primary Examiner* — Arun Goyal
(74) *Attorney, Agent, or Firm* — Carlson, Gaskey & Olds, P.C.

(57) ABSTRACT

A de-icing system for a gas turbine engine according to an exemplary aspect of the present disclosure includes, among other things, a forward assembly and a rear assembly adjacent to the forward assembly. One of the forward assembly and the rear assembly is rotatable relative to the other to generate an amount of air friction between said forward and rear assemblies.

18 Claims, 4 Drawing Sheets

(56) References Cited

U.S. PATENT DOCUMENTS

| | | | |
|---|---|---|---|
| 3,489,338 | A | 1/1970 | Chilman |
| 3,834,157 | A | 9/1974 | Hoffmann |
| 3,925,979 | A | 12/1975 | Ziegler |
| 4,485,619 | A | 12/1984 | Moore et al. |
| 4,546,604 | A | 10/1985 | Moore et al. |
| 4,831,819 | A | 5/1989 | Norris et al. |
| 4,863,354 | A | 9/1989 | Asselin et al. |
| 4,941,317 | A | 7/1990 | Ivey et al. |
| 5,746,580 | A | 5/1998 | Parker et al. |
| 6,561,760 | B2 * | 5/2003 | Wadia ............... F01D 25/02 415/145 |
| 7,581,378 | B2 | 9/2009 | Brand et al. |
| 7,647,761 | B2 | 1/2010 | Gauthier et al. |
| 7,658,077 | B2 | 2/2010 | Earith et al. |
| 7,938,368 | B2 | 5/2011 | Hogate |
| 8,015,789 | B2 | 9/2011 | Brand et al. |
| 8,210,825 | B2 | 7/2012 | Jensen et al. |
| 2008/0279688 | A1 | 11/2008 | Jensen et al. |
| 2013/0039759 | A1 | 2/2013 | Perkinson |

FOREIGN PATENT DOCUMENTS

| | | |
|---|---|---|
| GB | 627885 | 8/1949 |
| GB | 777694 | 6/1957 |
| GB | 1432789 | 4/1976 |
| GB | 2204361 | 10/1991 |
| WO | 02086298 | 10/2002 |

OTHER PUBLICATIONS

International Preliminary Report on Patentability for PCT Application No. PCT/US2014/032300 dated Oct. 15, 2015.

* cited by examiner

GAS TURBINE ENGINE DE-ICING SYSTEM

BACKGROUND

This disclosure relates to a gas turbine engine, and more particularly to a gas turbine engine de-icing system.

A gas turbine engine typically includes at least a fan section, a compressor section, a combustor section, and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

During flight, ice can form on portions of the engine, such as on a spinner or a static nosecone of an upstream portion of a fan section. Ice build-up on the spinner, nosecone or other hardware can result in reduced engine efficiency and/or damage to downstream components caused by broken pieces of ice entering the core flow path of the engine. An amount of heated bleed air or oil from a downstream compressor or turbine section of the engine is typically communicated to de-ice a portion of the gas turbine engine.

SUMMARY

A de-icing system for a gas turbine engine according to an exemplary aspect of the present disclosure includes, among other things, a forward assembly and a rear assembly adjacent to the forward assembly. At least one of the forward assembly and the rear assembly is moveable relative to the other of the forward assembly and the rear assembly to generate an amount of air friction between the forward and rear assemblies.

In a further non-limiting embodiment of the foregoing de-icing system, at least one of the forward assembly and the rear assembly is rotatable relative to the other of the forward assembly and the rear assembly.

In a further non-limiting embodiment of either of the foregoing de-icing systems, the forward assembly and the rear assembly are axially spaced apart.

In a further non-limiting embodiment of any of the foregoing de-icing systems, the forward assembly and the rear assembly each includes at least one paddle.

In a further non-limiting embodiment of any of the foregoing de-icing systems, one of a spinner and a nosecone is in contact with the forward assembly.

In a further non-limiting embodiment of any of the foregoing de-icing systems, the one of the spinner and the nosecone defines an internal cavity, each of the forward assembly and the rear assembly at least partially located within the internal cavity.

In a further non-limiting embodiment of any of the foregoing de-icing systems, the forward assembly includes a forward support structure extending from the one of the spinner and the nosecone, and the rear assembly includes a rear support structure extending from a fan hub.

In a further non-limiting embodiment of any of the foregoing de-icing systems, a seal is configured to retain an amount of fluid within the internal cavity.

In a further non-limiting embodiment of any of the foregoing de-icing systems, an engagement mechanism is configured to move the rear assembly in an axial direction between a de-icing position and an inoperable position.

A gas turbine engine according to an exemplary aspect of the present disclosure includes, among other things, an exposed component defining an internal cavity and a de-icing system including a forward assembly and a rear assembly each located within the internal cavity. At least one of the forward assembly and the rear assembly is rotatable relative to the other of the forward assembly and the rear assembly.

In a further non-limiting embodiment of the foregoing gas turbine engine, the forward assembly and the rear assembly are axially spaced apart.

In a further non-limiting embodiment of either the foregoing gas turbine engines, the forward assembly and the rear assembly each includes at least one paddle.

In a further non-limiting embodiment of any of the foregoing gas turbine engines, the exposed component includes one of a spinner and a nosecone in contact with the forward assembly.

In a further non-limiting embodiment of any of the foregoing gas turbine engines, a fan hub is mounted to the spinner.

In a further non-limiting embodiment of any of the foregoing gas turbine engines, an inlet guide vane assembly is mounted to the nosecone.

In a further non-limiting embodiment of any of the foregoing gas turbine engines, the forward assembly includes a forward support structure extending from the one of the spinner and the nosecone, and the rear assembly includes a rear support structure extending from a fan hub.

In a further non-limiting embodiment of any of the foregoing gas turbine engines, an engagement mechanism is configured to move the rear assembly in the axial direction between a de-icing position and an inoperable position.

A method of de-icing a gas turbine engine according to another exemplary aspect of the present disclosure includes, among other things, mechanically generating an amount of heat within an internal cavity of an exposed component and transferring the amount of heat from the internal cavity to a surface of the exposed component.

In a further non-limiting embodiment of the foregoing method of de-icing a gas turbine engine, the step of mechanically generating the amount of heat includes generating an amount of air friction within the internal cavity.

In a further non-limiting embodiment of either of the foregoing methods of de-icing a gas turbine engine, the method includes the step of rotating at least one of a forward assembly and a rear assembly relative to the other of the forward assembly and the rear assembly to mechanically generate the amount of heat.

These and other features disclosed herein can be best understood from the following specification and drawings, the following of which is a brief description.

DETAILED DESCRIPTION

Figure 1:
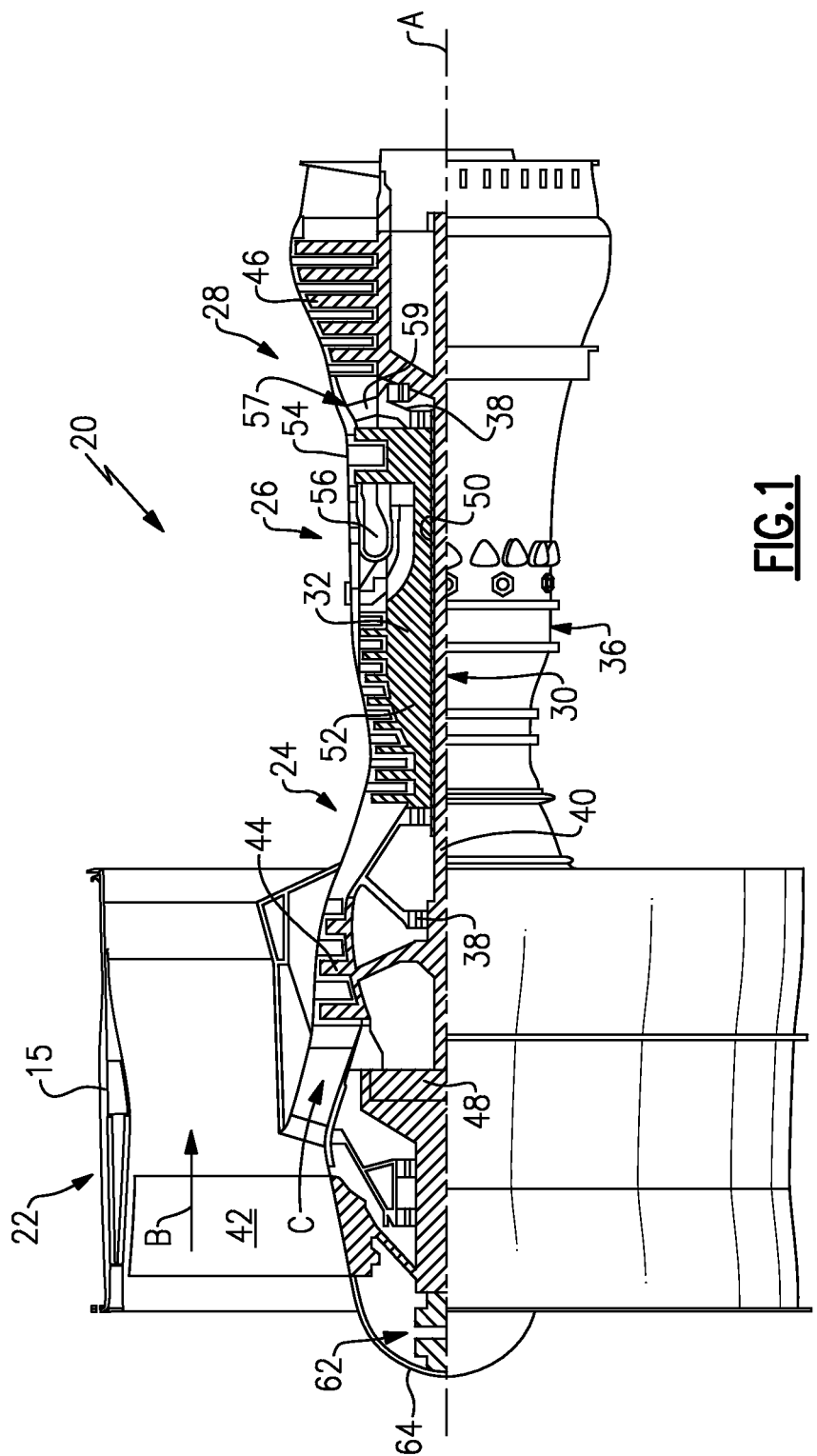
FIG. 1 is a schematic view of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 50 may be varied. For example, gear system 50 may be located aft of combustor section 26 or even aft of turbine section 28, and fan section 22 may be positioned forward or aft of the location of gear system 48.

Figure 2:
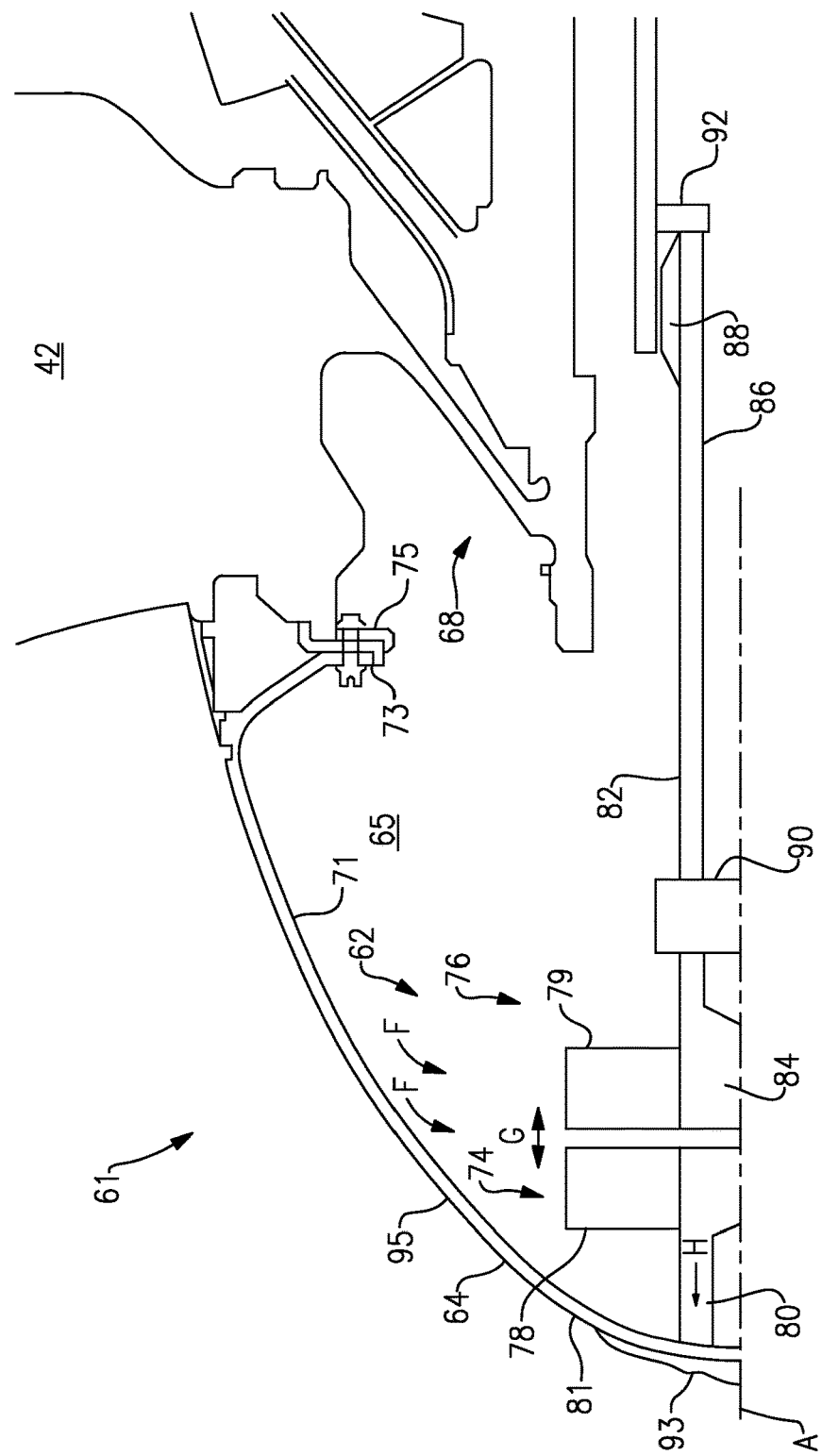
FIG. 2 is a schematic view of a de-icing system.

FIG. 2 illustrates a portion 61 of a gas turbine engine 20 that can include a de-icing system 62. In this disclosure, like reference numerals designate like elements where appropriate and reference numerals with the addition of one-hundred or multiples thereof designate modified elements that are understood to incorporate the same features and benefits of the corresponding original elements. In this embodiment, the portion 61 includes an exposed component such as a spinner 64. However, other parts of the gas turbine engine 20 may benefit from these teachings. The spinner 64 is located partially within the fan section 22 forward of the fan 42 to guide air along the bypass flow path B and the core flow path C (see FIG. 1). The spinner 64 defines an internal cavity 65 having a generally domed-shaped configuration and an interior surface 71. Generally, an amount of fluid F is located in the internal cavity 65 and may comprise an amount of air. In another embodiment, the fluid F includes an amount of oil. The fan 42 is mounted to a fan hub 66 at a pair of flanges 73, 75 adjacent to each other. The fan hub 66 and the low speed spool 30 are mechanically connected through the geared architecture 48 (shown schematically in FIG. 1). The spinner 64 is attached to and rotates with the fan hub 66 about the longitudinal axis A.

In one embodiment, the de-icing system 62 includes a rotating forward assembly 74 adjacent to the spinner 64 and a counter-rotating rear assembly 76. The rear assembly 76 is axially spaced apart from the forward assembly 74 along the longitudinal axis A to define a gap G therebetween. The forward assembly 74 includes one or more forward paddles 78 and the rear assembly 76 includes one or more rear paddles 79. Generally, each of the paddles 78, 79 extend radially about the longitudinal axis A and are arranged adjacent to each other. Each of the paddles 78, 79 may include a metallic, composite or other thermally conductive material. The rear paddles 79 could also include a thermally non-conductive material.

The forward and rear paddles 78, 79 are generally aerodynamically inefficient and may each include a generally planar configuration. In another embodiment, the forward and rear paddles 78, 79 may be concave or convex. In yet another embodiment, the forward and rear paddles 78, 79 may each include a plurality of protrusions, ridges, channels or other features to increase communication with the fluid F in the internal cavity 65. Other shapes, sizes and orientations of the paddles 78, 79 are also contemplated.

The forward paddles 78 may be supported by a forward support structure 80 extending from a proximal end 81 of the spinner 64. Alternatively, the forward paddles 78 may be directly fastened to the spinner 64. In another embodiment, the forward paddles 78 may be welded, adhesively bonded to or integrally formed with the spinner 64 to improve thermal conductivity therebetween.

The rear assembly 76 includes a rear support structure 82 that supports the rear paddles 79. The rear support structure 82 includes a first support member 84 and a second support member 86. The first support member 84 extends along the longitudinal axis A between the rear paddles 79 and the second support member 86. The second support member 86 extends parallel to the longitudinal axis A between the first support member 84 and the fan hub 68. Generally, the second support member 86 is connected to the inner shaft 40 or another rotating component of the engine 20. The rear assembly 76 may include a seal 92 (shown schematically), such as a knife edge seal, adjacent to the fan hub 68 to retain the fluid F in the internal cavity 65. Although a knife edge seal is described in this embodiment, other types of seal arrangements may be used such as a brush seal configuration, a labyrinth seal or another type of seal. By sealing the internal cavity 65, the pressure inside the internal cavity 65 can be improved over an open cavity arrangement. However, an open cavity arrangement could also be incorporated. The seal 92 may also be arranged in another location of the de-icing system 62, and more than one seal 92 may be included.

The rear support structure 82 may include a disengagement mechanism 90 (shown schematically) disposed between the first and second support members 84, 86. The disengagement mechanism 90 is configured to move the first support member 84 and the rear paddles 79 axially between a de-icing position and an inoperable position, thereby increasing the length of the gap G. Generally, the paddles 78, 79 do not contact each other when the rear paddles 79 are located in the de-icing position. When the rear paddles 79 are located in the de-icing position, the rear paddles 79 oppose rotation of the forward paddles 78 in the circumferential direction. Generally, the rear paddles 79 do not oppose movement of the forward paddles 78 when the rear paddles 79 are located in the inoperable position. The disengagement mechanism 90 may be axisymmetric and may include one temperature-actuated component formed of a bimetal or a high coefficient of thermal expansion (CTE) material. However, other configurations to move the first support member 84 and the rear paddles 79 are contemplated. The disengagement mechanism 90 may also be configured to minimize rotation of the rear paddles 79 and the first support member 84 about the longitudinal axis A.

Figure 3:
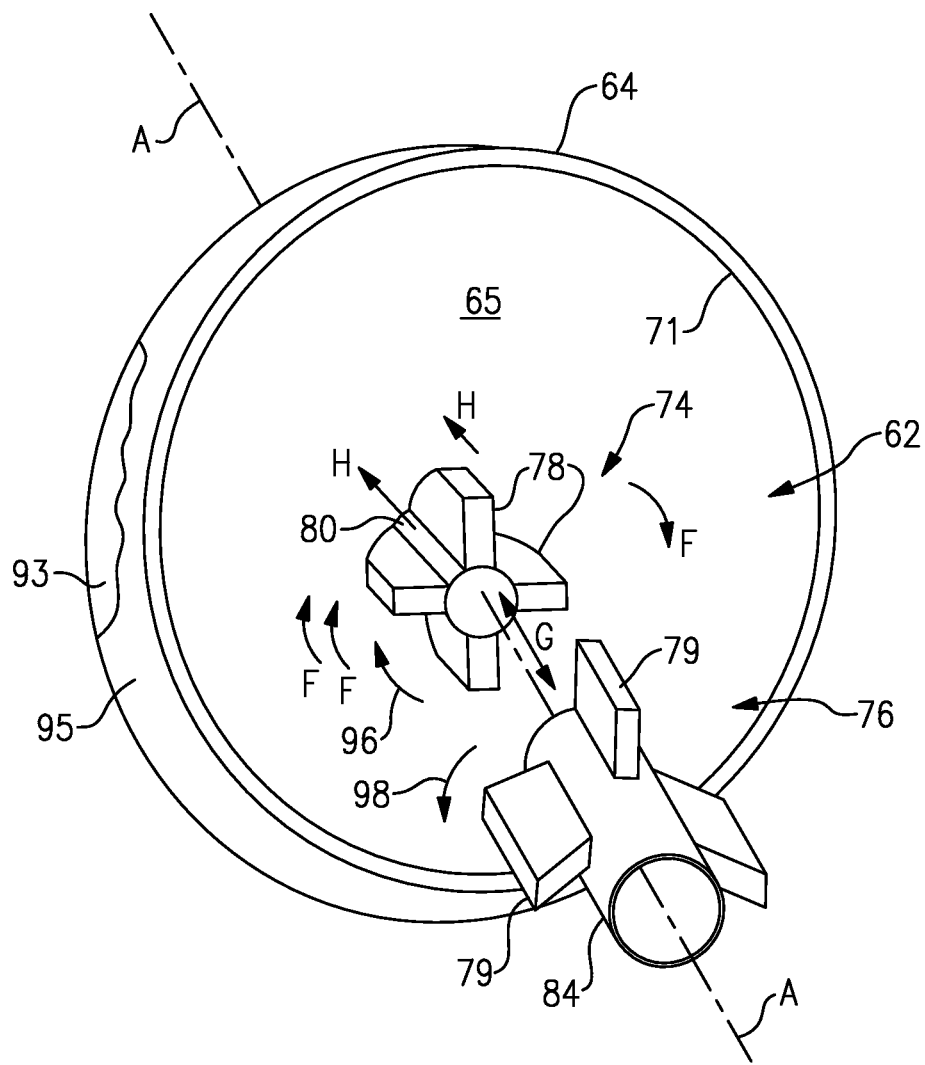
FIG. 3 is a partial perspective view of the de-icing system of FIG. 2.

During gas turbine engine operations, an amount of ice 93 can form on an exterior surface 95 of the spinner 64. The de-icing system 62 generates an amount of heat H within the internal cavity 65 and transfers the heat H to the spinner 64. Referring to FIGS. 2 and 3, the forward paddles 78 rotate about the longitudinal axis A in a direction 96, thereby circulating the fluid F within the internal cavity 65 generally in the direction 96. The direction 96 may be either clockwise or counter-clockwise with respect to the longitudinal axis A. The rear paddles 79 are configured to counter-rotate about the longitudinal axis A in a direction 98 opposite to the direction 96. The rear paddles 79 may extend axially toward the forward paddles 78 from the inoperable position to the de-icing position thereby decreasing the length of the gap G. It should be understood that the rear paddles 79 may also be extended to the de-icing position before the forward paddles 78 begin to rotate.

The rear paddles 79 do not rotate about the longitudinal axis A in the direction 96 and therefore oppose the circulation of the fluid F in the internal cavity 65. Therefore, the paddles 78, 79 mechanically generate an amount of air friction, commonly referred to as "windage." The air friction created between the paddles 78, 79 restricts the rotation of the forward paddles 78 in the direction 96, causing the forward paddles 78 to generate an amount of heat H therein. The heat H is transferred from the forward paddles 78 to the interior surface 71 of the spinner 64 by thermal conduction and by forced convection. As a result, the temperature of an exterior surface 95 of the spinner 64 adjacent to the forward paddles 78 is increased, causing an amount of ice 93 accumulated on the exterior surface 95 to melt. The rear paddles 79 may be retracted to the inoperable position when the aircraft is operating in above-freezing conditions or other conditions, thereby preventing the forward paddles 78 from transferring an excessive amount of heat to the spinner 64.

Figure 4:
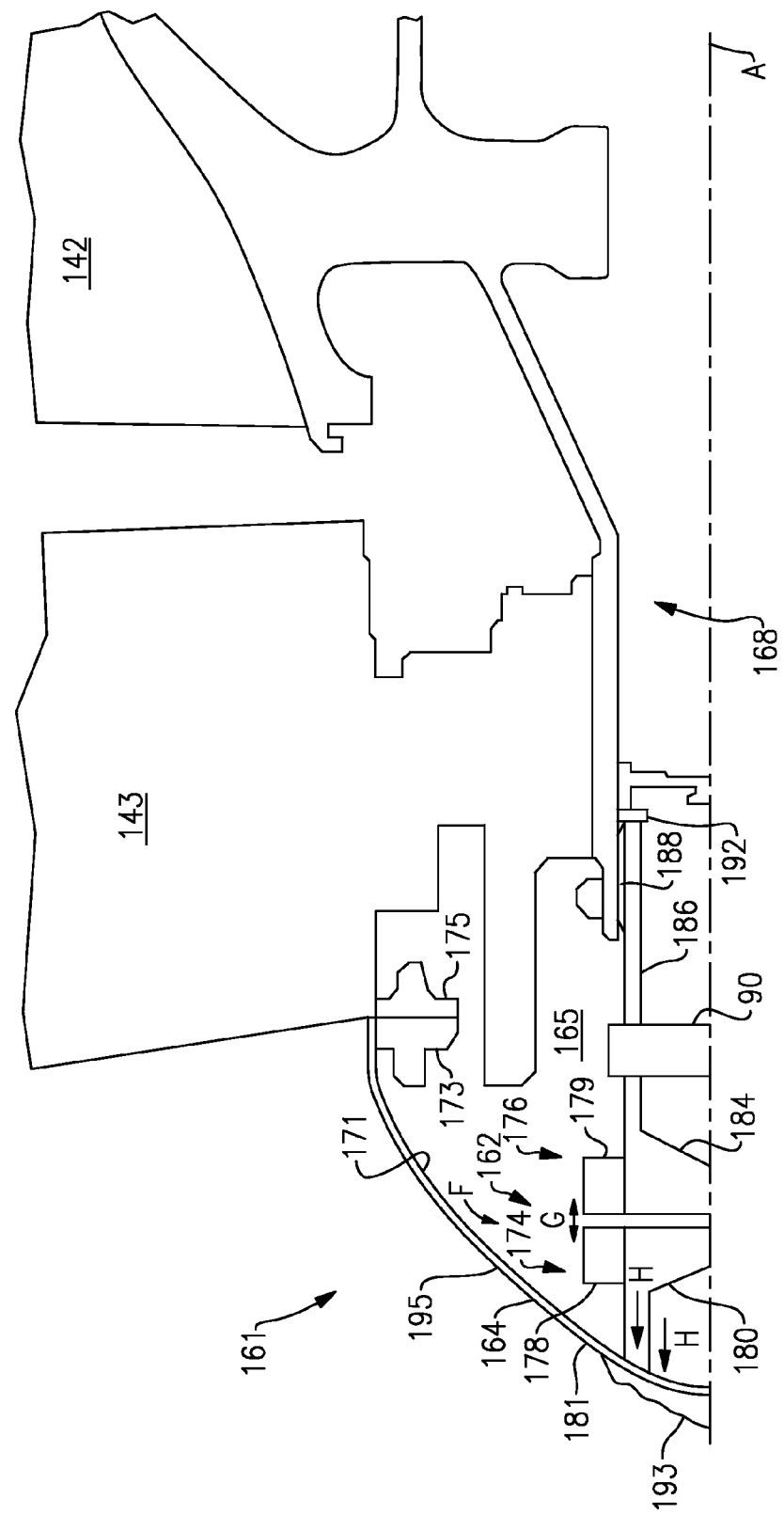
FIG. 4 is a schematic view of a second embodiment of the de-icing system.

FIG. 4 illustrates a second embodiment of a de-icing system 162 including a non-rotating forward assembly 174 and a rotating rear assembly 176. A nosecone 164 is connected to an inlet guide vane assembly 143. Generally, the inlet guide vane assembly 143 is connected to a static structure of the aircraft and is configured to remain stationary about the longitudinal axis A. A fan hub 168 is configured to rotate a fan 142. A second support member 186 is connected to the fan hub 168 and is configured to rotate about the longitudinal axis A. Accordingly, the forward assembly 174 is stationary and the rear assembly 176 rotates about the longitudinal axis A to generate an amount of windage.

Although the different embodiments have the specific components shown in the illustrations, embodiments of this disclosure are not limited to those particular combinations. It is possible to use some of the components or features from one of the embodiments in combination with features or components from another one of the embodiments. Additionally, the forward assembly, the rear assembly or both of the assemblies can rotate to generate heat.

The preceding description is exemplary rather than limiting in nature. Variations and modifications to the disclosed embodiments may become apparent to those skilled in the art that do not necessarily depart from the essence of this disclosure. The scope of legal protection given to this disclosure can only be determined by studying the following claims.

What is claimed is:

1. A de-icing system for a gas turbine engine comprising:
an exposed component defining an internal cavity, said exposed component being one of a spinner and a nosecone that guides airflow toward a fan;
a forward assembly including a forward support structure that extends from an inner wall of said exposed component such that said forward assembly is at least partially located within said internal cavity at a location axially forward of said fan with respect to an engine longitudinal axis;
a rear assembly adjacent to said forward assembly;
wherein said forward assembly and said rear assembly each includes at least one paddle extending in a radially direction with respect to said engine longitudinal axis, said at least one paddle of said forward assembly connected to said forward support structure, and said at least one paddle of said rear assembly connected to a rotatable shaft; and
wherein at least one of said forward assembly and said rear assembly is rotatable relative to the other of said forward assembly and said rear assembly such that an amount of air friction is generated in said internal cavity between said forward assembly and said rear assembly.

2. The de-icing system of claim 1, wherein said forward assembly and said rear assembly are axially spaced apart with respect to said engine longitudinal axis.

3. The de-icing system of claim 1, wherein said rear assembly is at least partially located within said internal cavity.

4. The de-icing system of claim 3, wherein said rear assembly includes a rear support structure extending from a fan hub.

5. The de-icing system of claim 3, comprising a seal configured to retain an amount of fluid within said internal cavity.

6. The de-icing system of claim 1, comprising an engagement mechanism configured to move said rear assembly in an axial direction with respect to said engine longitudinal axis between a de-icing position and an inoperable position.

7. A gas turbine engine comprising:
a fan mounted to a fan hub, said fan hub rotatable about an engine longitudinal axis;
a compressor section, wherein said fan delivers airflow to an inlet of said compressor section;
a turbine section that drives said fan hub and said compressor section;
an exposed component defining an internal cavity axially forward of said fan with respect to said engine longitudinal axis, wherein said exposed component includes one of a spinner and a nosecone that guides airflow along a flow path toward said fan;
a de-icing system including a forward assembly and a rear assembly each located within said internal cavity such that said forward assembly is at least partially located within said internal cavity at a location axially forward of said fan with respect to said engine longitudinal axis;

wherein said forward assembly and said rear assembly each includes at least one paddle extending in a radially direction with respect to said engine longitudinal axis, said at least one paddle of said forward assembly connected to said exposed component, and said at least one paddle of said rear assembly connected to a rotatable shaft; and wherein at least one of said forward assembly and said rear assembly is rotatable relative to the other of said forward assembly and said rear assembly.

8. The gas turbine engine of claim 7, wherein said forward assembly and said rear assembly are axially spaced apart to define a clearance gap, said clearance gap being axially forward of said fan with respect to said engine longitudinal axis.

9. The gas turbine engine of claim 7, wherein said forward assembly includes a forward support structure extending in an axial direction from an inner wall of said exposed component that defines said internal cavity toward said fan hub with respect to said engine longitudinal axis.

10. The gas turbine engine of claim 9, wherein said fan hub is mounted to said spinner, and said exposed component is said spinner.

11. The gas turbine engine of claim 9, comprising an inlet guide vane assembly mounted to said nosecone, and said exposed component is said nosecone.

12. The gas turbine engine of claim 9, wherein said rear assembly includes a rear support structure extending from said fan hub.

13. The gas turbine engine of claim 9, wherein:

said at least one paddle of said forward assembly includes a first set of paddles mounted to said forward support structure; and said at least one paddle of said rear assembly includes a second set of paddles mounted to a rear support structure such that said first set of paddles are axially spaced apart from said first set of paddles along said clearance gap.

14. The gas turbine engine of claim 13, comprising:

an engagement mechanism configured to move said second set of paddles of said rear assembly in said axial direction between a de-icing position and an inoperable position; and wherein a length of said clearance gap corresponding to said de-icing position is less than a length of said clearance gap corresponding to said inoperable position such that said second set of paddles oppose rotation of said first set of paddles in said de-icing position to cause said forward assembly and said rear assembly to mechanically generate an amount of heat in said internal cavity, but said second set of paddles do not oppose movement of said first set of paddles in said inoperable position.

15. The gas turbine engine of claim 13, wherein said first set of paddles and said second set of paddles are positioned in a portion of said internal cavity that has a generally dome-shaped configuration.

16. The gas turbine engine of claim 7, comprising an engagement mechanism configured to move said rear assembly in an axial direction with respect to the engine longitudinal axis between a de-icing position and an inoperable position.

17. A method of de-icing a gas turbine engine, comprising:

mechanically generating an amount of heat within an internal cavity of an exposed component at a location that is axially forward of a fan with respect to an engine longitudinal axis, including rotating at least one of a forward assembly and a rear assembly relative to the other of said forward assembly and said rear assembly to mechanically generate said amount of heat, said forward assembly including a first paddle connected to said exposed component, said rear assembly including a second paddle connected to a rotatable shaft, said first paddle and said second paddle each extending in a radial direction with respect to said engine longitudinal axis, and said exposed component including one of a spinner and a nosecone that guides airflow along a flow path toward said fan; and transferring said amount of heat from said internal cavity to a surface of said exposed component adjacent to said location.

18. The method as recited in claim 17, wherein the step of mechanically generating said amount of heat includes generating an amount of air friction within said internal cavity.

* * * * *